(12) United States Patent
Agan et al.

(10) Patent No.: US 7,812,259 B2
(45) Date of Patent: Oct. 12, 2010

(54) METAL-CLAD CABLE WITH FORAMINOUS CODED LABEL

(75) Inventors: Benny E. Agan, Bremen, GA (US); Mark D. Dixon, Carrollton, GA (US); William K. Hardin, Carrollton, GA (US); Randy D. Kummer, Villa Rica, GA (US); Richard Temblador, Carrollton, GA (US)

(73) Assignee: Southwire Company, Carrollton, GA (US)

( * ) Notice: Subject to any disclaimer, the term of this patent is extended or adjusted under 35 U.S.C. 154(b) by 0 days.

(21) Appl. No.: 12/258,034

(22) Filed: Oct. 24, 2008

(65) Prior Publication Data

US 2010/0101821 A1 Apr. 29, 2010

(51) Int. Cl.
  *H01B 7/00* (2006.01)
(52) U.S. Cl. ...................................... 174/112
(58) Field of Classification Search ............. 174/110 R, 174/112, 113 R, 36, 200, 278; 116/200, 116/278; 40/316; 428/36, 43; 156/52, 73.1
See application file for complete search history.

(56) References Cited

U.S. PATENT DOCUMENTS

| | | | |
|---|---|---|---|
| 951,147 A | 3/1910 | Porter | |
| 2,070,679 A | 2/1937 | Pebock et al. | |
| 2,106,048 A | 1/1938 | Candy, Jr. | |
| 2,372,868 A | 4/1945 | Warren, Jr. | |
| 2,591,794 A | 4/1952 | Ebel | |
| 2,628,998 A | 2/1953 | Frisbie | |
| 3,020,335 A | 2/1962 | Gillis | |
| 3,197,554 A | 7/1965 | Baker | |
| 3,212,207 A * | 10/1965 | Searing | ........................ 40/316 |
| 3,328,514 A | 6/1967 | Cogelia | |
| 3,459,878 A | 8/1969 | Gressitt et al. | |
| 3,474,559 A | 10/1969 | Hunt | |
| 3,551,542 A | 12/1970 | Perrone | |
| 3,650,862 A | 3/1972 | Burr | |
| 3,720,747 A | 3/1973 | Anderson et al. | |
| 3,994,090 A | 11/1976 | Wheeler | |
| 4,021,315 A | 5/1977 | Yanagida et al. | |
| 4,029,006 A | 6/1977 | Mercer | |
| 4,128,736 A | 12/1978 | Nutt et al. | |
| 4,158,746 A | 6/1979 | Taylor et al. | |
| 4,161,564 A | 7/1979 | Legbandt | |
| 4,274,086 A | 6/1981 | Benckendorff et al. | |
| 4,278,836 A | 7/1981 | Bingham | |
| 4,423,306 A | 12/1983 | Fox | |
| 4,424,627 A | 1/1984 | Tarbox | |
| 4,425,390 A * | 1/1984 | Changani et al. | .............. 428/43 |
| 4,528,420 A | 7/1985 | Kish et al. | |
| 4,543,448 A | 9/1985 | Deurloo | |
| 4,579,759 A | 4/1986 | Breuers | |

(Continued)

FOREIGN PATENT DOCUMENTS

CH    590 544    8/1977

(Continued)

*Primary Examiner*—William H Mayo, III
(74) *Attorney, Agent, or Firm*—Gardere Wynne Sewell LLP

(57) ABSTRACT

A metal-clad cable having a plurality of spaced apart labels. The labels have coded information about the cable and are conductive and/or include a plurality of openings so as to assure conductivity between an outer sheath of the metal-clad cable and a terminating assembly connector member coupled thereto.

40 Claims, 2 Drawing Sheets

U.S. PATENT DOCUMENTS

| | | | |
|---|---|---|---|
| 4,629,285 A | | 12/1986 | Carter et al. |
| 4,636,017 A | * | 1/1987 | Boteler .................. 439/492 |
| 4,636,271 A | * | 1/1987 | Gandolfo ................ 156/73.1 |
| 4,880,484 A | | 11/1989 | Obermeier et al. |
| 4,947,568 A | * | 8/1990 | De Barbieri .............. 40/316 |
| 4,997,994 A | | 3/1991 | Andrews et al. |
| 5,038,001 A | | 8/1991 | Koegel et al. |
| 5,110,638 A | * | 5/1992 | Vogdes et al. ............ 428/35.1 |
| 5,289,767 A | | 3/1994 | Montalto et al. |
| 5,444,466 A | | 8/1995 | Smyczek et al. |
| 5,470,253 A | | 11/1995 | Siems et al. |
| 5,504,540 A | | 4/1996 | Shatas |
| 5,557,071 A | | 9/1996 | Falciglia et al. |
| 5,561,900 A | * | 10/1996 | Hosler, Sr. .................. 29/828 |
| 5,703,983 A | | 12/1997 | Beasley, Jr. |
| 5,719,353 A | | 2/1998 | Carlson et al. |
| 5,739,472 A | | 4/1998 | Buck et al. |
| 5,862,774 A | * | 1/1999 | Moss ........................ 116/200 |
| 6,277,456 B1 | * | 8/2001 | Bulgrin et al. ............ 428/40.1 |
| 6,311,637 B1 | | 11/2001 | Moss |
| 6,404,972 B1 | | 6/2002 | Pasch et al. |
| 6,727,433 B2 | | 4/2004 | Tsai |
| 6,817,895 B2 | | 11/2004 | Kiely |
| 6,906,264 B1 | | 6/2005 | Grant, Jr. et al. |
| 2009/0001707 A1 | * | 1/2009 | Brooks ........................ 283/81 |
| 2009/0095398 A1 | * | 4/2009 | Hardin et al. .................. 156/52 |

FOREIGN PATENT DOCUMENTS

| | | |
|---|---|---|
| DE | 1902057 | 10/1970 |
| DE | 4016445 | 8/1991 |
| GB | 194419 | 3/1923 |
| GB | 332303 | 7/1930 |
| GB | 913514 | 12/1962 |
| GB | 1117862 | 6/1968 |
| GB | 1432548 | 4/1976 |
| GB | 2154785 | 9/1985 |
| JP | 49-020780 | 2/1974 |
| JP | 50-046970 | 4/1975 |
| JP | 52-121679 | 10/1977 |
| JP | 55-120031 | 9/1980 |
| JP | 56-027667 | 9/1982 |
| JP | 57198510 | 12/1982 |
| JP | 59087194 | 5/1984 |
| JP | 58203336 | 5/1985 |
| JP | 62-037186 | 2/1987 |
| JP | 64-081113 | 3/1989 |
| JP | 1-134808 | 5/1989 |
| JP | 3-25806 | 2/1991 |
| JP | 3-067411 | 3/1991 |
| JP | 03-173015 | 7/1991 |
| JP | 04-163048 | 6/1992 |
| JP | 04-312850 | 11/1992 |
| NL | 6510231 | 2/1966 |

* cited by examiner

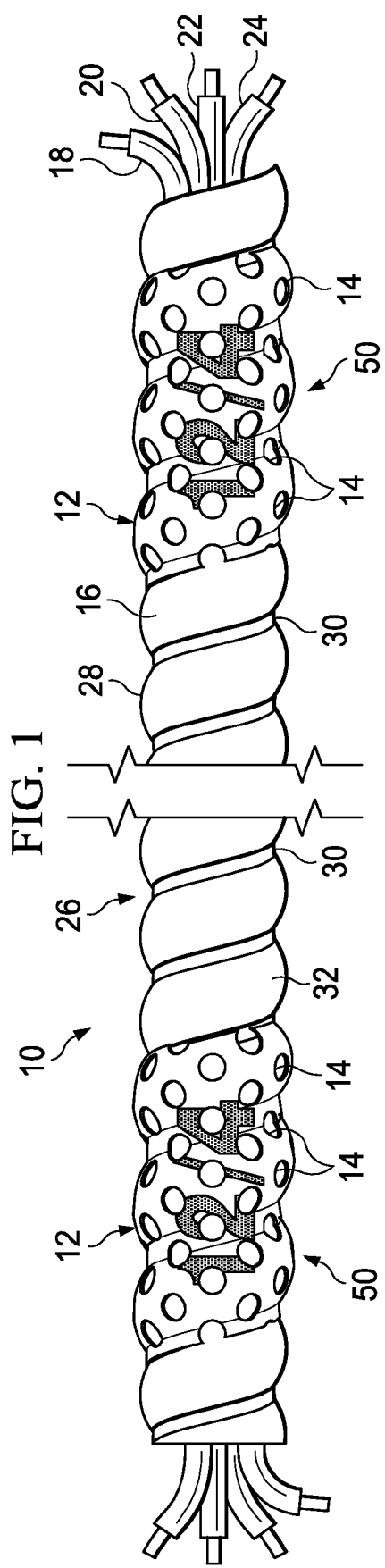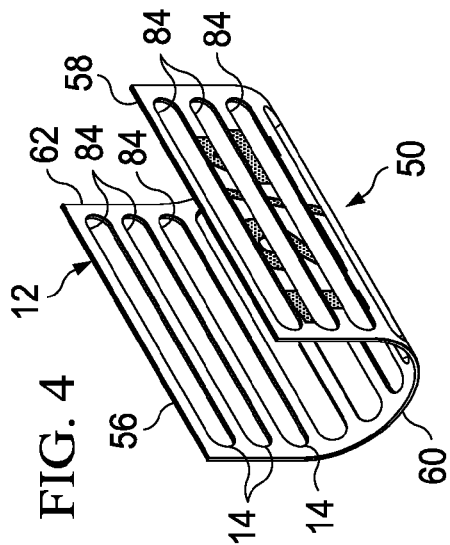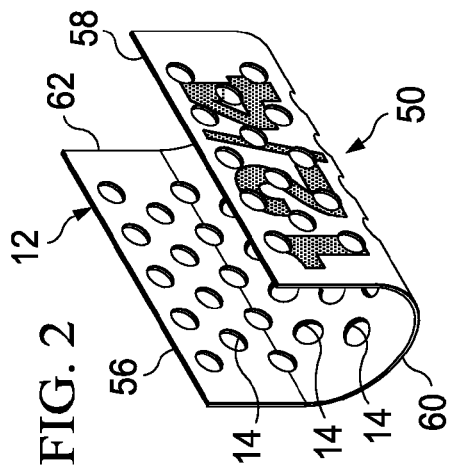

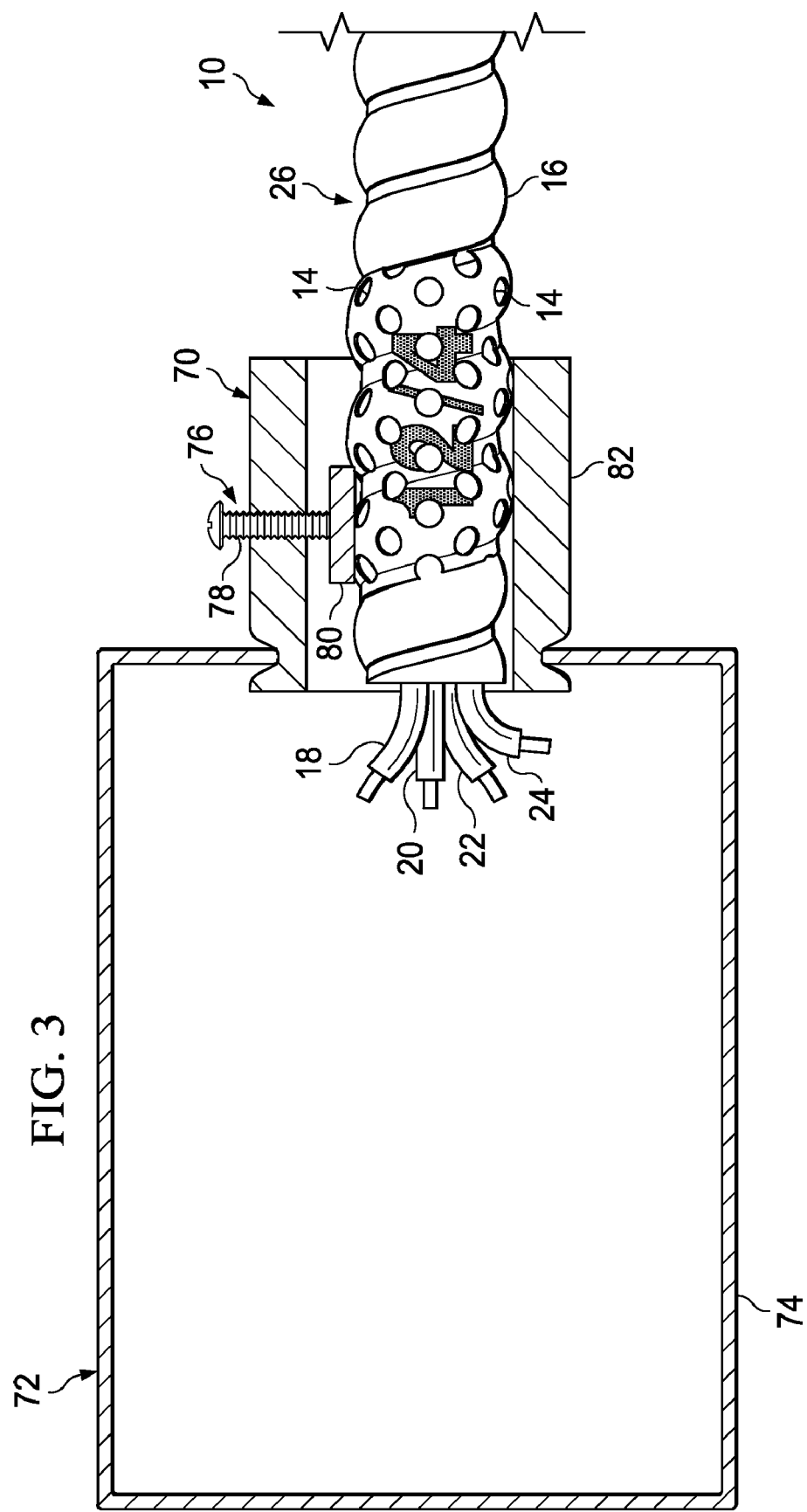

METAL-CLAD CABLE WITH FORAMINOUS CODED LABEL

BACKGROUND

When manufacturing armored electrical cable, it is desirable and often necessary to apply coded information on the exterior of the armor sheath to indicate, for example, certain characteristics and/or applications of the various cables. Due to the irregular exterior surface of armored cable, however, it is difficult to apply printed information directly to the surface. Accordingly, it would be useful if pre-coded strips or labels or the like could be applied to the surface of the cable. However, when terminating the cable in order to connect to an enclosure, such as, for example, a junction or termination box, it is apparent that if the termination occurs at the location of a label of non-electrically conductive material, the electrical connectivity/bonding path between the junction and the armor sheath could be impeded. It is therefore a principal object to arrive at a solution which enables the application of coded labels to and along the metal sheath of an armored cable without the interruption of the required conductivity path at the termination situs.

SUMMARY

In accordance with one aspect of the present invention, a metal-clad cable having a plurality of spaced apart coded labels along the cable is provided. Each of the labels is preferably encoded with information regarding the cable, e.g., type of cable and/or application (i.e., intended use) of the cable. The labels each include one or more openings therein and are positioned on the cable to assure conductivity between the outer sheath of the cable and a connector member coupled thereto. For example, when an end-user terminates the cable over a label in order to couple the terminated cable end to a connector member for attachment to a termination box, the openings are positioned to enable and otherwise maintain electrical connectivity and thus a bonding path between the outer sheath and the connector member.

In accordance with another aspect of the present invention, a method of manufacturing a metal-clad cable comprises providing a flexible label, applying coded information regarding the cable on the flexible label, and forming at least one opening through the flexible label. The method further includes wrapping the flexible label at least partially around the outer conductive sheath of the metal-clad cable to position the opening(s) therein to enable electrical connectivity, and thus a bonding path, between the outer conductive surface and a connector member when the connector member is coupled to the cable over the label.

In accordance with another aspect of the present invention, the coded labels are of an electrically conductive material.

For a more complete understanding of the present invention, including additional features, objects and advantages thereof, reference is now made to the following detailed description taken in conjunction with the drawings, in which:

BRIEF DESCRIPTION OF THE DRAWINGS

FIG. 1 is an illustration of a section of metal-clad armored electrical cable in which a plurality of spaced apart foraminous coded labels are employed to advantage to indicate one or more characteristics and/or applications of the cable;

FIG. 2 is a perspective view of the label of FIG. 1;

FIG. 3 is a section view of the metal-clad armored electrical cable of FIG. 1 secured by a connector to a termination box; and FIG. 4 is a perspective view of an alternate embodiment of the label of FIG. 1.

DETAILED DESCRIPTION

In the description which follows, like parts are marked throughout the specification and drawings with the same reference numerals, respectively. The drawings may not be to scale and certain features may be shown exaggerated in scale or in somewhat schematic form in the interest of clarity and conciseness.

FIG. 1 is an illustration of a metal-clad armored electrical cable 10 in which a plurality of spaced apart foraminous labels 12 are employed to advantage and encoded to indicate one or more of the characteristics and/or intended applications of cable 10. In the embodiment illustrated in FIG. 1, labels 12 include one or more openings 14 disposed therein such that if cable 10 is terminated over a label 12 and coupled to an enclosure, such as, for example, a termination or junction box, electrical connectivity and thus a bonding path between the conductive outer sheath 16 of cable 10 and the termination elements is maintained without interruption.

In the embodiment illustrated in FIG. 1, cable 10 is characterized by outer conductive sheath 16 wrapped around plural, elongated and flexible electrical conductors 18, 20, 22 and 24. According to the illustrated embodiment, sheath 16 is formed of a metal strip having overlapping and interlocking adjacent helical convolutions, an example of which is described in U.S. Pat. No. 6,906,264, assigned to the assignee of the present application, the disclosure of which is incorporated by reference herein. For example, as best illustrated in FIG. 1, metal sheath 16 is formed of a metal strip, such as aluminum, having convolutions 26 that overlap or interlock with uniformly spaced "crowns" 28 and "valleys" 30 defining the outer surface 32 of sheath 16. However, it should be understood that metal sheath 16 may be otherwise configured, such as, for example, a solid or non-interlocked metallic covering.

Each label 12 may be formed of a thin layer of a heat shrinkable polymer material, such as, for example, biaxial polypropylene and thus be of an essentially electrically non-conductive material. However, it should be understood that for this foraminous embodiment, labels 12 can be formed of any type of non-conductive material. As illustrated in FIG. 1, labels 12 are attached to surface 32 at spaced apart and discrete intervals along the length of cable 10, preferably ten feet apart so as to assist the cable installer determining cable lengths in the field. It should be understood, however, that alternate spacing may be employed. One method of attaching labels 12 to cable 10 is described in U.S. patent application Ser. No. 11/870,676, assigned to the assignee of the present application, the disclosure of which is incorporated by reference herein.

As illustrated in the drawings, label 12 has coded information 50 regarding the cable, including, but not limited to, a characteristic and/or intended application of the cable. For example, the numeric coding "12/4" shown on the label indicates, in this example, that there are four conductors, as shown, of a "12 AWG" wire size or gauge. The label itself is of a color, for example grey, which indicates that the cable is for use with 277/480 volt systems or white, which indicates that the cable is for use with 120/208 volt systems. Alternatively, the coded information 50 may comprise different alpha-numeric characters, label colors, graphics, symbols and the like, or combinations thereof, used for coded identification.

As illustrated in FIGS. 2 and 3, label 12 is preferably rectangular and provided with opposed longitudinal side edges 56 and 58 and opposed lateral edges 60 and 62. Label 12 may be wrapped around sheath 16 with a slight amount of overlap between the edges 56 and 58, with edge 56 covered by the edge 58, for example, and the label provided with a layer of suitable adhesive on the side opposite the side containing the coded information 50. It should be understood that labels 12 may be otherwise configured, and may extend only partially around sheath 16, if desired.

As best illustrated in FIG. 3, the openings 14 facilitate electrical connectivity and/or otherwise enable a bonding path to exist between sheath 16 and a conductive connector member 70 when cable 10 is coupled to an enclosure 72, such as, for example, a junction or termination box 74. Referring specifically to FIG. 3, connector member 70 is used for securing cable 10 to metal termination box 74. In FIG. 3, connector member 70 includes a cable locking mechanism 76 having a metal screw 78 and a metal plate 80 for positioning cable 10 adjacent a wall 82 of connector 70 for securing cable 10 to termination box 74. Thus, connector member 70 makes electrical and mechanical contact with cable 10, and specifically sheath 16, via screw 78, plate 80 and wall 82 of connector 70 to provide uninterrupted electrical connectivity therebetween. Accordingly, in the event cable 10 is terminated over label 12 such that all or a portion of label 12 is exposed on the terminated end of cable 10, openings 14 on label 12 enables and/or otherwise maintains uninterrupted electrical connectivity between sheath 16 and connector 70 (via screw 78, plate 80 and connector wall 82) and thus termination box 74.

Referring specifically to FIG. 2, openings 14 may be disposed in a plurality of rows, with openings 14 in each respective row being staggered or offset from an adjacently positioned row to ensure adequate contact between sheath 16 and connector member 70 (FIG. 3). For example, the staggered pattern of openings 14 ensure that at least a portion of openings 14 are aligned with and generally overlay crowns 28 of sheath 16 to ensure that crowns 28 are directly exposed for contact with wall 82 of connector member 70 to provide for electrical connectivity therewith. It should be understood, however, that other spacing and shape configurations of openings 14 may be used. For example, openings 14 may include a larger or smaller diameter, be formed of a different shape (e.g., oval, square, triangular, etc.) and/or be spaced in a non-staggered relationship. For example, in the embodiment illustrated in FIG. 4, openings 14 comprise a plurality of elongated slots 84 extending substantially between edges 60 and 62; however it should be understood that slots 84 may be otherwise configured (e.g., extending laterally between edges 56 and 58, extending a shorter length, having an increased/decreased width, curvilinear, etc.).

Furthermore, according to an alternate embodiment, label 14 may be configured such that the actual shape, the position and/or number of openings 14 may be directly used to provide the coded information 50 to indicate and/or correspond to the characteristic and/or specific application of cable 10. For example, the numerical designation "12/4" (indicating wire size and number of conductors, respectively) may itself be in the form of a cut-out, thereby avoiding the need to print this coded information 50 on the label and, if properly sized and located, providing the necessary conductive path between the cable sheath and the connector.

As an additional alternative embodiment, the spaced labels 12 may be formed of a material that is sufficiently conducive, in and of itself, to provide the required conductive path between the cable sheath and connector assembly.

Although specific embodiments have been described in detail, those skilled in the art will also recognize that various substitutions and modifications may be made without departing from the scope and spirit of the appended claims.

What is claimed is:

1. A metal-clad cable having an outer conductive sheath, comprising:
   a plurality of spaced apart labels on the sheath, the labels having coded information about the cable, each label having a plurality of openings positioned therein to maintain conductivity between the outer sheath of the metal-clad cable and a connector member coupled to the conductive sheath.

2. The metal-clad cable of claim 1, wherein the plurality of openings are positioned in a plurality of rows.

3. The metal-clad cable of claim 2, wherein the openings on adjacent rows are positioned in staggered relationship relative to each other.

4. The metal-clad cable of claim 1, wherein the openings are circular.

5. The metal-clad cable of claim 4, wherein the openings comprise an elongated slot.

6. The metal clad cable of claim 1, wherein the coded information on the label corresponds to a shape of the opening.

7. The metal-clad cable of claim 1, wherein the coded information on the label comprises printed information on the label.

8. The metal-clad cable of claim 1, wherein the coded information on the label corresponds to the number of openings on the label.

9. The metal-clad cable of claim 1, wherein the label is conductive.

10. The metal-clad cable of claim 1, wherein the label is formed of a polymer material.

11. The metal-clad cable of claim 10, wherein the polymer material is a biaxial polypropylene.

12. The metal-clad cable of claim 1, wherein the coded information on the label is indicative of voltage rating of the cable.

13. The metal-clad cable of claim 1, wherein the coded information on the label is indicative of a number of conductors within the sheath.

14. The metal-clad cable of claim 1, wherein the coded information on the label is indicative of the size of the conductors within the sheath.

15. A method of manufacturing a metal-clad cable, comprising:
   providing a label;
   applying coded information on the label regarding the cable;
   forming at least one opening in the label; and
   wrapping the label at least partially around an outer sheath of the metal-clad cable such that the openings are positioned to enable conductivity between the outer sheath of the metal-clad cable and a connector member coupled thereto.

16. The method of claim 15, further comprising:
   providing a second label;
   applying coded information on the second label regarding the cable;
   forming at least one opening in the second label; and
   wrapping the second label at least partially around an outer sheath of the metal clad cable at a spaced apart interval from the label such that the openings are positioned thereon to enable conductivity between the outer sheath of the metal-clad cable and a connector member coupled thereto.

17. A label for identifying an armored electrical cable, comprising:
    a sheet having coded information regarding the cable, the sheet having at least one opening therein such that when the label is coupled to an outer sheath of the armored electrical cable, the opening is positioned to enable conductivity between the outer sheath and a connector member coupled to the armored electrical cable.

18. The label of claim 17, wherein the sheet is formed of a polymer material.

19. The label of claim 18, wherein the polymer material is a biaxial polypropylene.

20. The label of claim 17, wherein the at least one opening is circular.

21. The label of claim 17, further comprising a plurality of rows of spaced apart openings.

22. The label of claim 21, wherein the openings in the plurality of rows are positioned in a staggered relationship relative adjacently positioned rows of the plurality of rows.

23. The label of claim 17, wherein the coded information on the sheet is indicative of voltage rating of the cable.

24. The label of claim 17, wherein the coded information on the sheet is indicative of a number of conductors within the sheath.

25. The label of claim 17, wherein the coded information on the sheet is indicative of the size of the conductors within the sheath.

26. A metal-clad cable having an outer conductive sheath, comprising:
    a plurality of spaced apart labels on the sheath, the labels having coded information about the cable, each label formed of a conductive material to maintain conductivity between the outer sheath of the metal-clad cable and a connector member coupled to the conductive sheath.

27. The metal-clad cable of claim 26, wherein the coded information on the label is indicative of voltage rating of the cable.

28. The metal-clad cable of claim 26, wherein the coded information on the label is indicative of the size of the conductors within the sheath.

29. A metal-clad cable, comprising:
    a label wrapped at least partially around the cable, the label having coded information about the cable, the label having at least one opening positioned therein to maintain conductivity between an outer sheath of the metal-clad cable and a connector member coupled thereto.

30. The metal-clad cable of claim 29, further comprising a plurality of rows of spaced apart openings.

31. The metal-clad cable of claim 30, wherein the openings on adjacent ones of the plurality of rows are positioned in staggered relationship relative to the adjacent ones of the plurality of rows.

32. The metal-clad cable of claim 29, wherein the at least one opening is circular.

33. The metal clad cable of claim 29, wherein the coded information on the label corresponds to the shape of the at least one opening.

34. The metal-clad cable of claim 29, wherein the coded information on the label comprises printed information.

35. The metal-clad cable of claim 29, wherein the label is formed of a polymer material.

36. The metal-clad cable of claim 35, wherein the polymer material is a biaxial polypropylene.

37. The metal-clad cable of claim 29, wherein the coded information on the label is indicative of a voltage rating of the cable.

38. The metal-clad cable of claim 29, wherein the coded information on the label is indicative of a number of conductors within the sheath.

39. The metal-clad cable of claim 29, wherein the coded information on the label is indicative of the size of the conductors within the sheath.

40. A coding system for an electrical cable of the type that is to have a connector member coupled thereto, said system comprising:
    an electrical cable having an electrically conductive outer sheath; and
    at least one label affixed to the outer sheath, the label having coded information regarding at least one of a characteristic or an intended application of the cable, the label having at least one opening positioned to maintain electrical conductivity between the outer sheath and the connector member at the location of the connector member's coupling to the cable.

* * * * *